United States Patent [19]
Levine

[11] 3,789,732
[45] Feb. 5, 1974

[54] MACHINE FOR ENGRAVING CURVED SURFACES
[75] Inventor: Jack W. Levine, Levittown, N.Y.
[73] Assignee: New Hermes Company, New York, N.Y.
[22] Filed: May 16, 1972
[21] Appl. No.: 253,724

[52] U.S. Cl............................ 90/13.6, 90/13.3
[51] Int. Cl............................................ B23b 1/18
[58] Field of Search ........ 90/13.6, 13.3, 13.2, 13.1; 33/22, 21 D, 21 R

[56] References Cited
UNITED STATES PATENTS
2,110,873  3/1938  Gorton et al. ................... 90/13.6

FOREIGN PATENTS OR APPLICATIONS
693,201  6/1953  England ...................... 90/13.1

Primary Examiner—Gil Weidenfeld
Attorney, Agent, or Firm—Seidel, Gonda & Goldhammer

[57] ABSTRACT

A machine for engraving surfaces which are cylindrical, tapered or curved. The machine includes pattern tracing means and an engraving tool connected thereto by a mechanism which causes the movement of the tracing means in the pattern to be reproduced by the engraving tool. Means are provided for always maintaining the engraving tool perpendicular to the surface which is being engraved.

18 Claims, 10 Drawing Figures

MACHINE FOR ENGRAVING CURVED SURFACES

This invention relates to engraving machines and more particularly to machines which can engrave surfaces which are either cylindrical, tapered or curved.

Cutting tools for engraving glass surfaces and the like are hollow cylindrical members. The cutting teeth are formed on the cylinder walls, and the diameter of the tool corresponds to the width of the line to be engraved. Unless the tool is perpendicular to the surface being engraved so that the cutting face is squarely in engagement therewith, the engraved lines will be distorted.

A similar problem arises when metals such as brass, silver or gold is engraved. Thus, the cutting tools used to engrave these materials must be perpendicular to the surface being engraved to avoid distortion. Typically the cutting face for these tools are pointed diamonds. They may be either conically shaped or faceted.

The cutting tools for glass and metals are supported in the engraving machine in suitable tool holders. The glass cutter rotates during engraving. The metal cutter may rotate during engraving, depending on the shape of the tool and the particular material and pattern being cut.

Machines known heretofore can position an engraving tool in perpendicular relation to the surface to be engraved when that surface is cylindrical or tapered for the reasons explained below. However, they cannot position the engraving tool in perpendicular relation to a curved surface.

When cylindrical surfaces are engraved, the problem noted above is not encountered with machines known heretofore because the surface can be secured in the engraving machine so that its longitudinal axis is coincident with the longitudinal axis of the engraving machine. Thus, if the engraving tool is arranged so that it lies along a radius from that axis, it will always be perpendicular to the cylindrical surface.

In like manner, a tapered surface may also be engraved with machines known heretofore by displacing its longitudinal axis relative to the axis of rotation of the engraving tool so that the engraved surface nearly approximates a cylindrical surface. However, when this technique is used, only a limited portion of the surface may be engraved.

This follows from the fact that while one portion of the circumference of the tapered surface is approximately concentric with the axis of rotation of the engraving machine, the remaining portions of the surface which are circumferentially displaced therefrom are curved about an axis which is at an angle relative to the axis of rotation of the engraving machine. Thus, if engraving is attempted on the other portions of the circumference, the engraving tool will not be perpendicular to the surface and distortion in the engraved lines will occur.

The most aggravated situation occurs when it is desired to engrave surfaces which are curved in two directions such as parfait glasses, brandy snifters, trophy cups and the like. As these surfaces curve continuously, they never present a cylindrical surface or a useful tapered surface for engraving. These surfaces cannot be engraved by machines known heretofore since those machines do not have structure which mounts the engraving tool so that it will always be perpendicular to the surface to be engraved without regard to the angle that surface makes with respect to the axis of rotation of the engraving machine.

The machine described herein overcomes the limitations of machines known heretofore. It permits surfaces at any angle relative to its axis to be engraved. This is accomplished by structure which always positions the engraving tool perpendicular to the surface being engraved.

Generally, the invention relates to a machine for engraving a surface which is curved about a longitudinal axis. The machine comprises means for supporting a pattern to be engraved on the curved surface and means defining a first axis of rotation. Additional means are provided for supporting an engraving tool. The last named means is operative to position the cutting face of the tool so that it lies along a radius from the first axis of rotation and is mounted on the machine for rotation about the first axis of rotation and for movement parallel thereto. Coupling means is provided for coupling the third means to a pattern to be engraved. And guide means are provided for maintaining an engraving tool in perpendicular relation to the surface to be engraved.

For the purpose of illustrating the invention, one presently preferred embodiment is shown in the drawings; it being understood, however, that this invention is not limited to the precise arrangements and instrumentalities shown and wherein.

Figures 1, 7:
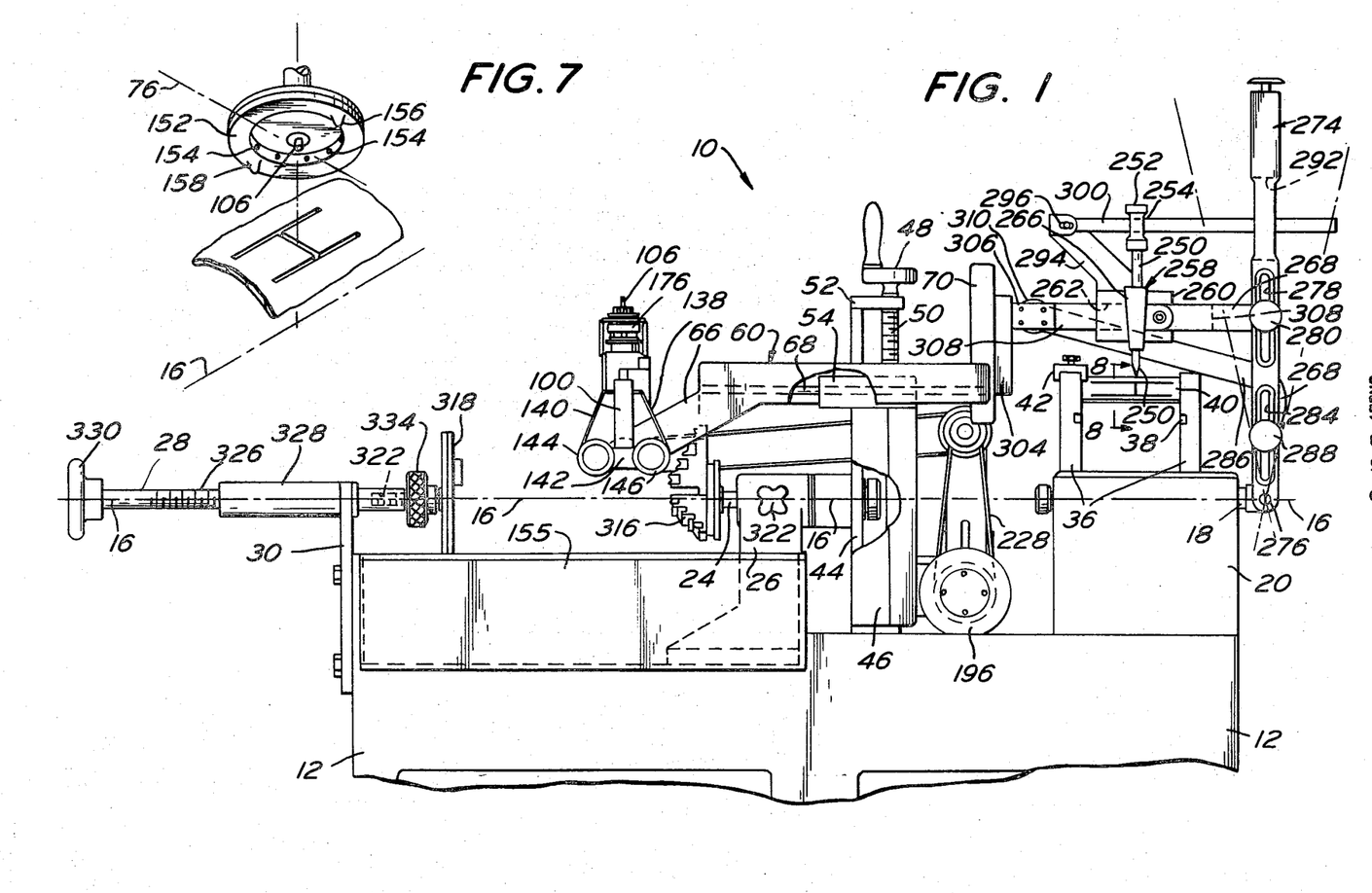
FIG. 1 is a side elevational view of a machine constructed in accordance with the invention.
FIG. 7 is a perspective view showing the relation between the engraving tool and the surface to be engraved.

Now referring to the drawings, an engraving machine 10 is illustrated in FIG. 1. The machine has a base 12 which supports a plurality of means which define a first axis of rotation 16. The first axis of rotation 16 is defined at one end of the engraving machine by a first trunnion 18 which is rotatably supported on platform 20 which is mounted on base 12. At an intermediate portion of the engraving machine, the first axis of rotation 16 is defined by a shaft 24 which is supported in a trunnion housing 26. At the other end of the engraving machine, the first axis of rotation 16 is defined by clamping screw 28 which is supported on base 12 by a plate 30.

A first means for mounting a pattern to be engraved on the machine is provided. Suitable means may comprise two spaced upwardly extending blocks 36 which are supported on platform 20. Each of the blocks 36 may be provided with an arcuate slot 38 (FIG. 8) in which arcuate pattern elements 40 may be slidingly received. Clamps 42 may be used to fix the pattern elements in place.

Figures 5, 8:
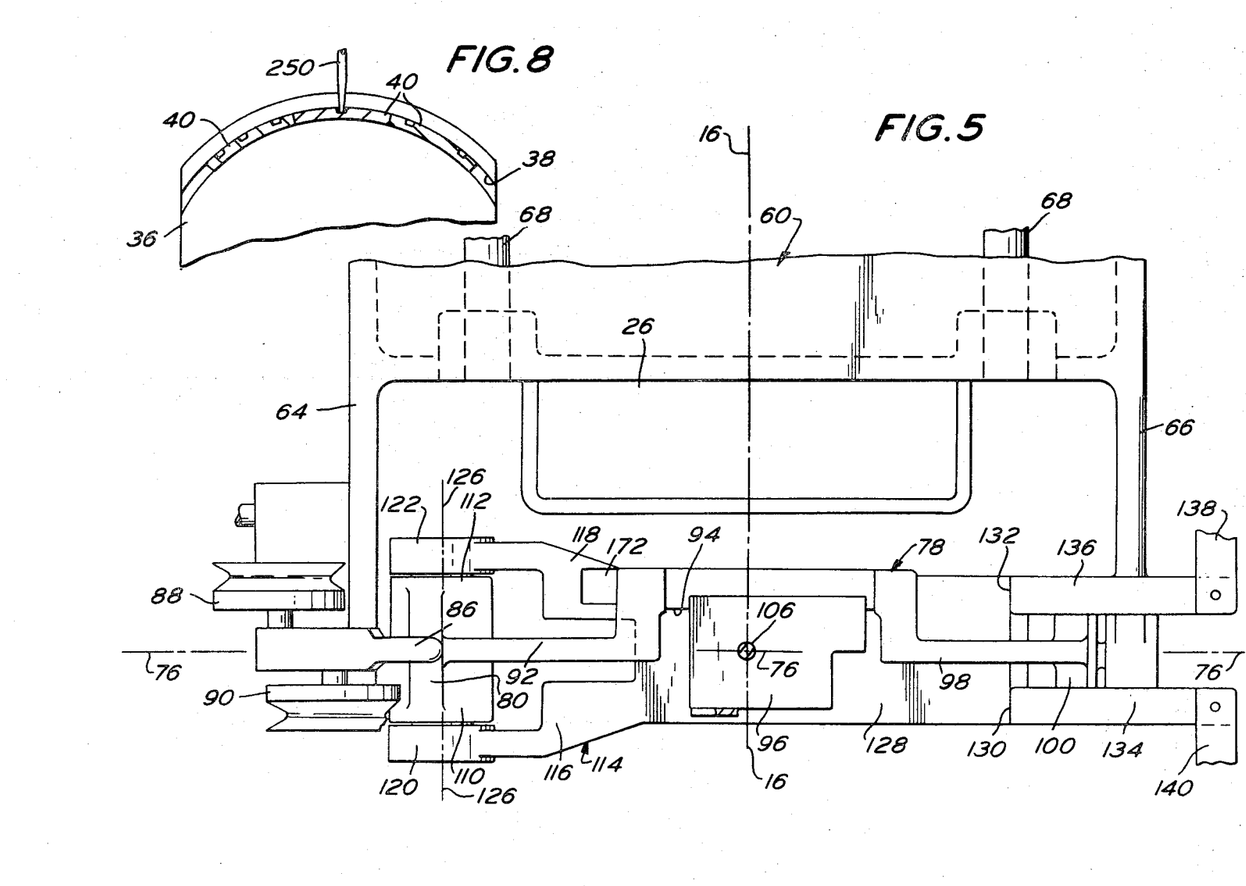
FIG. 5 is an enlarged plan view showing the details of a portion of FIG. 2.
FIG. 8 is a sectional view taken along line 8—8 of FIG. 1.

Alternatively, other means for securing the pattern elements on the blocks may be used. It should be noted that the slot 38 defines an arc having its center coincident with the first axis of rotation 16 (FIG. 8). It is preferred that the elements of the pattern lie on an arc. However, satisfactory results can be obtained with flat elements that are positioned to approximate an arc.

Means are provided for supporting an engraving tool. The means comprise a radially directed plate 44 which is secured to shaft 24 for rotation about the first axis of rotation. The radially directed plate 44 is slidingly coupled to a slide plate 46 (FIG. 2) for longitudinal sliding movement along a radius from the first axis of rotation 16. The slide plate 46 may be displaced along radially directed plate 44 by rotation of a crank 48 which is connected to a threaded shaft 50. The crank bears against a bracket 52 which is supported on radially directed plate 44. The threaded shaft 50 terminates in a block (not shown) which is fixed to the slide plate 46 in a manner well known. Hence, rotation of crank 48 will cause the slide plate 46 to be displaced relative to the radially directed plate 44. At the top of slide plate 46 two laterally directed webs 52 support elongated cylindrical bearings 54. The bearings are arranged so that their longitudinal axes are parallel to the first axis of rotation 16.

Figure 2:
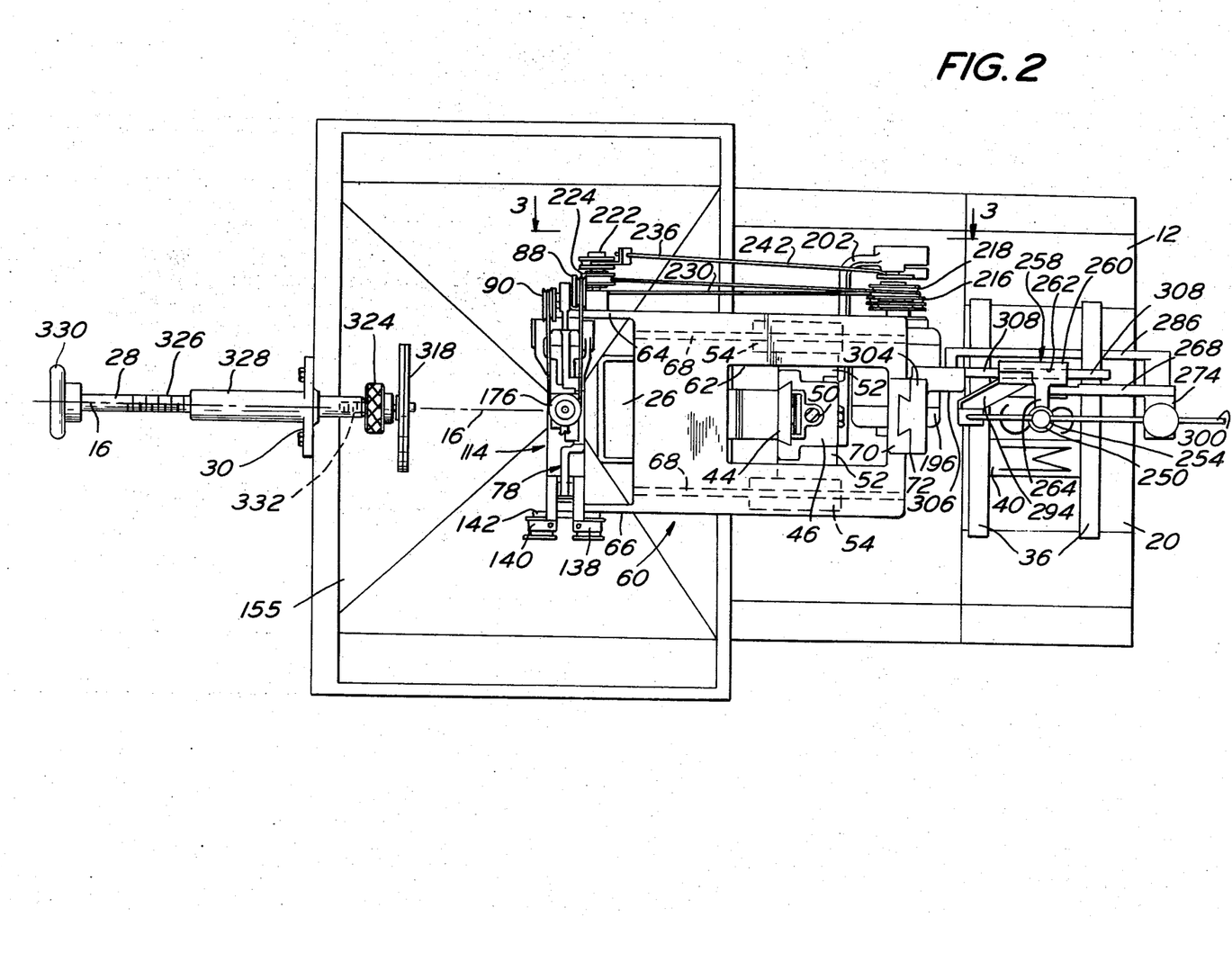
FIG. 2 is a plan view of the machine illustrated in FIG. 1.

A cross carriage 60 is supported on the elongated cylindrical bearings 54. As best seen in FIG. 2, the cross carriage is a generally rectangular member having a central aperture 62 through which the aforementioned radially directed plate 44 and slide plate 46 may extend. At one end, the cross carriage has two forwardly extending and downwardly depending spaced ears 64 and 66. The cross carriage is substantially hollow and supports two spaced parallel slide rods 70 therein. Each of the slide rods 70 is received within one of the elongated cylindrical bearings 54 so that the cross carriage may be reciprocated along a path which is parallel to the first axis of rotation.

At its end remote from ears 64 and 66, the cross carriage supports a vertically disposed plate 70 having a dovetail track 72 formed therein. Plate 70 and dovetail track 72 permit the cross carriage 60 to remain connected to the pattern tracing means as it is moved toward and away from the first axis of rotation. The structure which accomplishes this result will be explained in detail below.

Figures 3, 6:
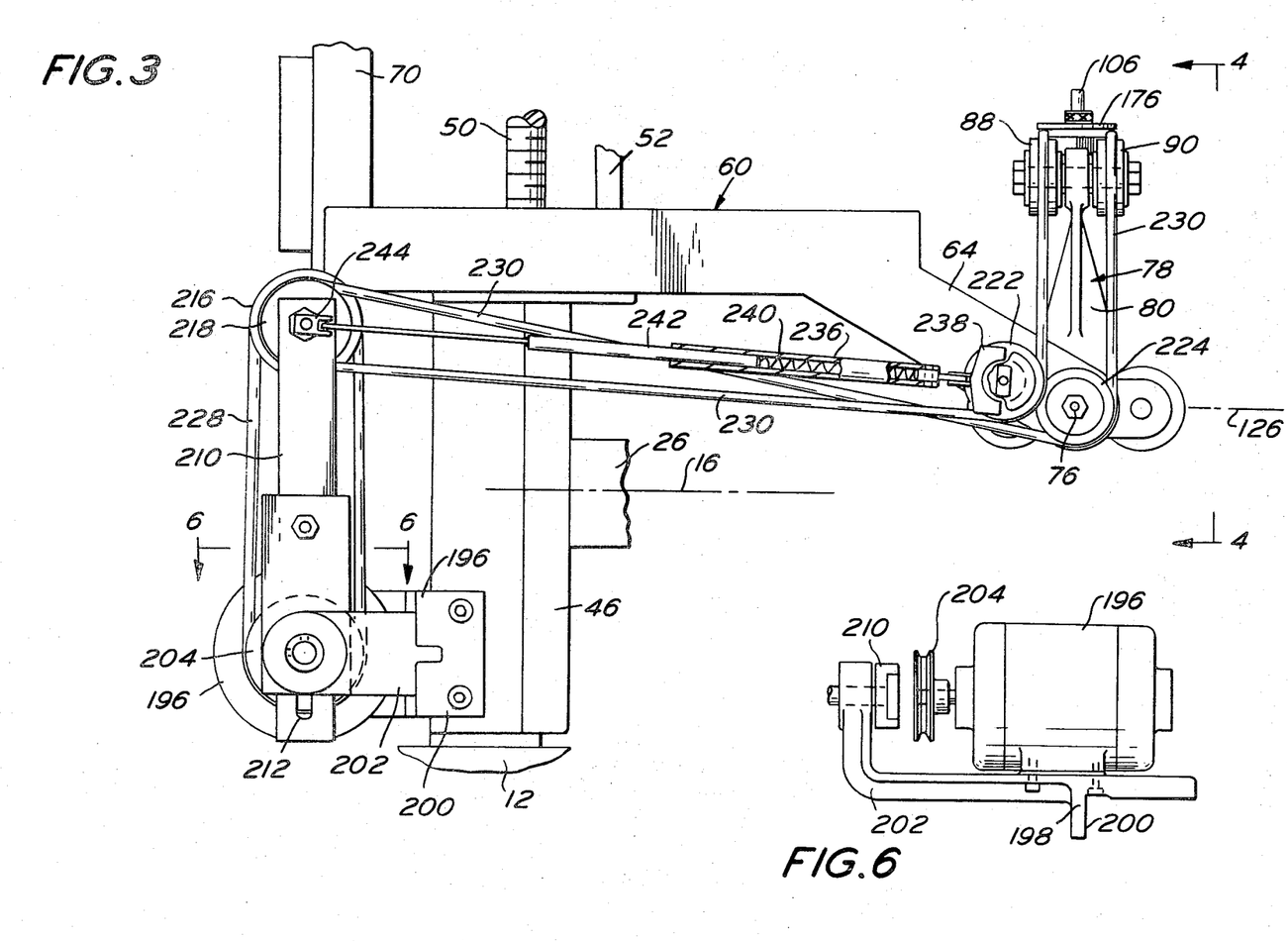
FIG. 3 is a view taken along line 3—3 of FIG. 2.
FIG. 6 is a sectional view taken along line 6—6 of FIG. 3.
Figures 4, 9, 10:
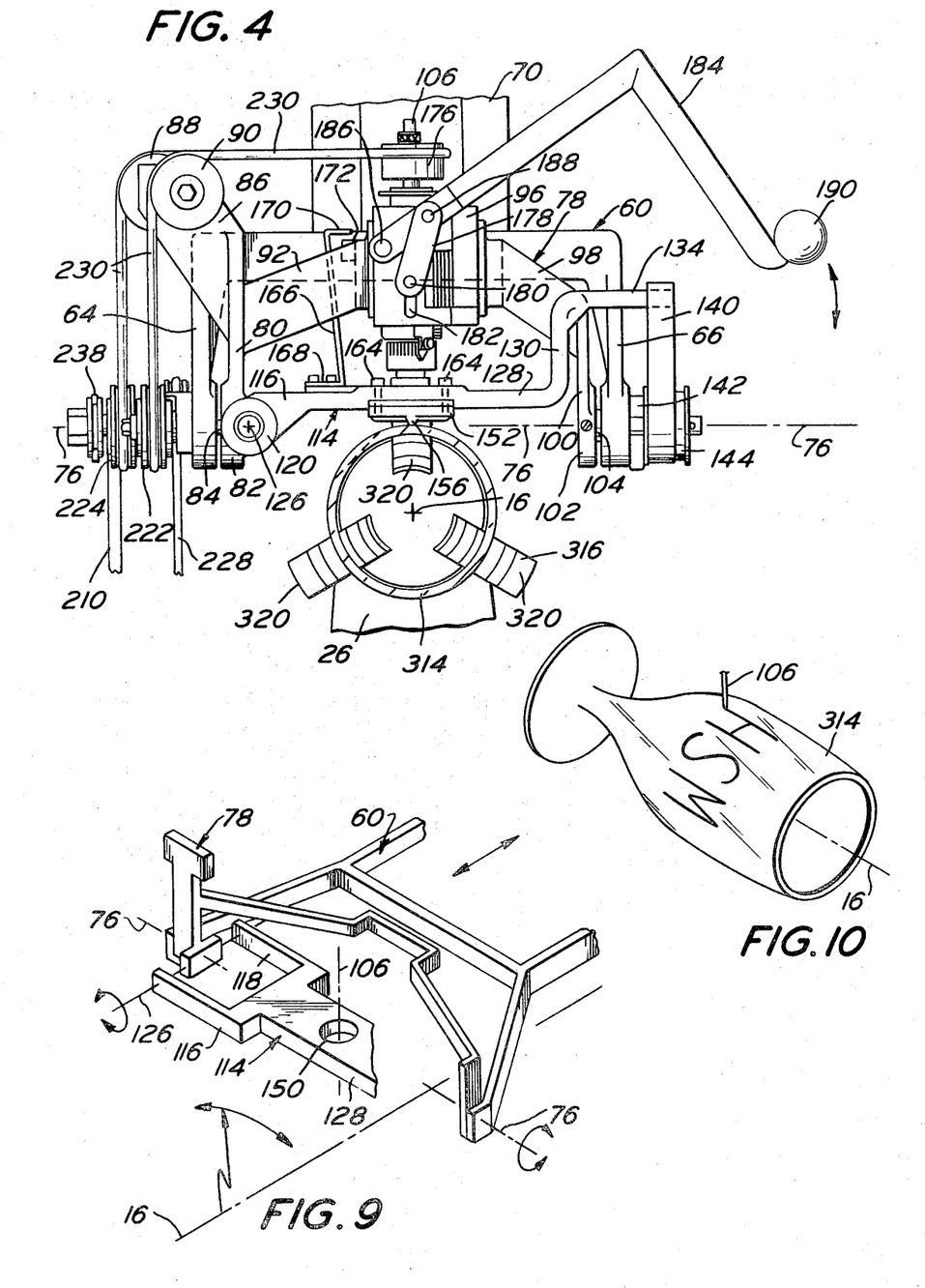
FIG. 4 is a view taken along line 4—4 of FIG. 3.
FIG. 9 is a perspective schematic view of the structure for supporting and controlling the engraving tool.
FIG. 10 is a perspective view of a typical surface which may be engraved.

Referring to FIGS. 3, 4 and 5, the forwardly extending and downwardly depending ears 64 and 66 define a second axis of rotation 76. The second axis of rotation is perpendicular to the first axis of rotation 16. However, it lies in a plane which is spaced from the first axis and which is parallel to a plane passing through that axis. As explained earlier, the distance between the first and second axes of rotation can be varied by rotating crank 48 to move the slide plate 46 and cross carriage 60.

A spindle carrier 78 is mounted on the cross carriage for rotation about the second axis of rotation 76. The spindle carrier comprises a first generally vertically disposed leg 80. At its base 82, leg 80 is connected to ear 64 by a suitable pin 84. Leg 80 supports an upwardly and outwardly extending arm 86. Sheaves 88 and 90 are rotatably supported on opposite sides of arm 86.

Leg 80 supports a second leg 92 which extends upward and in a direction opposite to leg 86. Leg 92 in part defines a recess 94 which supports a chuck 96 for an engraving tool 106. At the far end of recess 94, a leg 98 corresponding to leg 92 is provided. Leg 98 is connected to a downwardly directed leg 100. A pin 104 connects the base 102 of leg 100 to ear 66 of the cross carriage.

It should be noted that both pins 84 and 104 lie along the second axis of rotation 76 so that the spindle carrier 78 may rotate about that axis thereby causing the chuck 96 and the cutting surface of an engraving tool 106 disposed therein to also rotate about that axis.

The spindle base 82 also supports forwardly and rearwardly extending trunnions 110 and 112. A surface follower 114 is supported on trunnions 110 and 112 for rotation in a manner to be explained.

As best seen in FIG. 5, the surface follower is disposed transversely of the first axis of rotation 16 and includes two legs 116 and 118. Each of the legs in turn supports a large bushing 120 and 122. The bushings are in alignment with and are connected to the trunnions 110 and 112 to define a third axis of rotation 126. Significantly, the third axis of rotation 126 is parallel to the first axis of rotation 16 and is displaced therefrom. Furthermore, both the second axis of rotation 76 and the third axis of rotation 126 intersect. This feature can best be seen in FIGS. 4 and 5.

The body 128 of the surface follower 114 extends across the first axis of rotation. At its end remote from bushings 120 and 122 it has two upwardly directed legs 130 and 12. The legs are spaced from each other and are disposed on either side of legs 98 and 100 on the spindle carrier. Thus, the upwardly directed legs 130 and 132 define a slot through which the leg 98 and 100 of the spindle carrier can be inserted.

Each of the upwardly directed legs has an outwardly extending arm 134 and 136.

Means are provided for urging the surface follower to rotate about the third axis of rotation 126 toward the first axis of rotation 16. Such means comprises in a presently preferred form of the invention, negator springs 138 and 140.

Each of the negator springs is supported on a bracket 142 (FIGS. 1 and 4) which is mounted on ear 66 in alignment with the second axis of rotation 76. The bracket extends forwardly and rearwardly of the ear to support spools 144 and 146. The force generated by a negator spring is constant. It is distinguished from a conventional spring by the fact that without regard to how much of it is unwound or wound the force it exerts is constant.

At its mid-portion, the body 128 has an aperture 150 (FIG. 9) which is circumscribed by a ring 152. The ring 152 may be hollow and have a plurality of radially inwardly directed openings 154 (FIG. 7) so that a cooling fluid can be discharged into the engraving zone. The spent cooling fluid is collected in pan 155. The ring 152 has guide means for assuring that the engraving tool remains perpendicular to the surface to be engraved. The guide means comprises two projections 156 and 158 which are carried on the lower surface of ring 152. The projections lie along radii which are in a plane which passes through the first axis of rotation 16 and are disposed on opposite sides of the engraving tool 106. A plane passed through both projections also passes through the second axis of rotation 76. Thus the cutting face of the engraving tool is always located at the intersection of the first and second axes of rotation. As seen in FIG. 4, the ring 152 may be supported on the surface follower by fasteners such as bolts 164.

A Z-shaped stop 166 is supported by one of its legs 168 on the surface follower while its other leg 170 is engageable with a projection 172 on the spindle carriage 78. The stop 166 is operative to constrain the surface follower against rotation about the third axis of rotation 126 under the force of the negator springs 138 and 140. Thus, the negator springs will cause clockwise rotation of the surface follower as illustrated in FIG. 4. However, this clockwise movement is limited by the engagement of leg 170 with projection 172.

The chuck 97 is mounted on the spindle carrier 78. The glass engraving tool 106 is an elongated member which extends through the chuck and is supported therein for reciprocating movement along a radius extending from the first axis of rotation 16. A sheave 176 is fixed to the end of the tool remote from the cutting surface. Rotation of sheave 176 causes rotation of the tool. The tool may be displaced vertically within the chuck. To this extent, a link 178 has a pin 180 connected to the engraving tool through a vertically extending elongated slot 182. As the juncture of pin 180 and the engraving tool 162 is achieved in a manner well known in the art and does not form a part of the present invention, it will not be described in detail other than to say that the pin is connected to a thrust bearing which permits the engraving tool to rotate freely while being displaced along its longitudinal axis.

Movement of the engraving tool along its axis is achieved by an elongated arm 184 which is pinned to the chuck at 186. Link 178 is connected to arm 184 by a pin 188. A knob 190 may be provided at the free end of arm 184. Thus, movement of arm 184 about pin 186 causes the engraving tool 106 to be raised and lowered within the chuck. Significantly, the cutting surface of the tool will lie between the projections 156 and 158 and will always be substantially at the intersection of the second axis of rotation 76 and a radius from the first axis of rotation 16 thereby assuring that the engraving tool 106 remains perpendicular to the surface being engraved.

As explained above, the cutting tool is rotated when glass is engraved. It may be rotated under certain circumstances when metal is engraved.

The drive for the engraving tool is accomplished by a suitable motor 196 which is supported on slide plate 46 by a bracket 198. The bracket has a lip 200 which is bolted to the side of slide plate 46. The bracket also includes an outwardly extending L-shaped arm 202.

The drive shaft of motor 196 supports drive sheave 204.

The L-shaped arm supports an inwardly extending adjustment plate 210. The adjustment plate is an elongated bar (FIGS. 1 and 3) which is pivotally connected to arm 202 for rotation about an axis which is coincident with the axis of drive sheave 204. A slot 212 permits vertical adjustment of the plate.

At its upper end, plate 210 supports two sheaves 216 and 218 which are fixed to each other and rotate about a common axis. While as illustrated in the drawing, sheave 216 is larger than sheave 218, this relationship is not critical to the operation of the invention. Hence, the sheaves can be of any convenient diameter; it being recognized that the speed of the engraving tool relative to the motor may be controlled thereby.

A main drive belt 228 is wrapped around drive sheave 204 and sheave 216. Thus, energization of the motor causes rotation of sheaves 216 and 218. A secondary drive belt 230 which is wrapped around sheave 218 is driven thereby. Its intermediate portions are entrained about sheaves 222 and 224 which are supported on cross carriage ear 64 and sheaves 88 and 90 on the spindle carrier. The secondary drive belt is wrapped around sheave 176 (FIGS. 3 and 4) to drive the engraving tool. Thus, it is apparent that energization of the motor 196 is operative to drive the cutting tool by way of the main and secondary drive belts 228 and 230. It is significant to note that the axis of rotation of sheave 224 on the cross carriage lies on the second axis of rotation 76 so that tension in the secondary drive belt is not varied as the spindle carriage rotates about that axis while following the contour of a surface to be engraved.

A means for tensioning secondary drive belt 230 is provided. The means includes a tensioning arm having an elongated hollow cylindrical section 236 that is pivotally connected to a yoke 238. The yoke 238 is slipped over the edge of a suitable member mounted adjacent sheave 222. A helical compression spring 240 is disposed within the cylindrical section 236. A rod 242 has one end pivotally connected to an end member 244. The end member 244 is pivotally connected to the free end of adjustment plate 210 for rotation about the axis corresponding to the axes of rotation of sheaves 216 and 218. Tension in the secondary drive belt 230 is achieved by the urging force of spring 236 against the end face of rod 242. It is to be noted that the tensioning means is free to move in response to rotational or translational movement of the cross carriage with respect to the first axis of rotation. Additionally, it is not affected by movement of the spindle carrier or the surface follower about their axes of rotation.

The juncture of rod 242 with end member 244 and hollow cylindrical section 236 with yoke 238 are about pivots which enable these two members to be swung radially outwardly without the end member and yoke being disengaged from the plate 210 and sheave 222.

The means for following a pattern to be engraved 40 can best be described by referring to FIGS. 1 and 2. The pattern tracing means includes a stylus 250 which is an elongated cylindrical member having a point at its end which traces the pattern. The upper end of the stylus is connected to an elongated cylindrical spool 252 having a radially disposed slot 254 therein.

The stylus housing has a substantially rectangular body 260 with an elongated slot 262. It has an outwardly extending arm 264 with a cylindrical recess 266 at its end. The mid-portion of the stylus 250 is supported within recess 266 so that it is constrained for movement along its longitudinal axis. The body 260 is pivotally connected to one end of control link 268 which has its other end pivotally coupled to an elongated control arm 274.

Elongated control arm 274 is mounted on shaft 18 for rotation about the first axis of rotation 16. It is connected to that shaft by pin 276 so that it can be pivoted into the positions shown by the dashed lines in FIG. 1. It includes a first adjustment slot 278. The adjustment slot receives the aforementioned other end of control link 268. The position of control link 268 in adjustment slot 278 is controlled by a nut 280. While the nut constrains the other end of control link 268 in fixed position to slot 278, the control link is free to rotate about that nut.

A lower adjustment slot 284 retains one end of lower control link 286 a fixed distance from the first axis of rotation 16 by a nut 288 which is similar to afore described nut 280. Thus, the lower control link 286 is free to rotate with respect to elongated control arm 276.

At its upper end the elongated control arm 274 has a slot 292 which is disposed at right angles with respect to the aforementioned slots 278 and 284.

The body 260 of the stylus housing includes an upwardly extending and forwardly directed arm 294 which has an elongated slot 296. The slot receives a horizontally extending pin which is connected to one end of an elongated stylus release arm 300. The stylus release arm passes through radially disposed slot 254 and slot 292 in the elongated control arm. Thus, movement of stylus release arm 300 about its pivotal connection in elongated slot 296 will move the tip of the stylus into and out of engagement with the pattern to be engraved.

A vertically extending dovetail 304 is slidingly received within track 72 on plate 70. As mentioned above, the plate 70 is fixed to the cross carriage 60. The dovetail 304 has a rearwardly extending arm 306. The arm has an elongated rearwardly extending section 308 which is slidingly received in slot 262 in the stylus housing. Thus, the stylus housing is supported on rearwardly extending section 308 for movement parallel to the first axis of rotation 16.

A nut 310 is connected to the arm 306 to pivotally support the other end of lower control link 286.

An object which is to be engraved such as the goblet 314 illustrated in FIG. 10 is secured to the engraving machine between jaws 316 and 318. As best seen in FIGS. 1 and 4, jaw 316 may have three spaced radially directed arms 320. The arms are provided with a plurality of concentric recesses to engage an item such as the goblet 314 so that its longitudinal axis is coincident with the first axis of rotation 16. To this extent, a lock screw 322 is provided on trunnion 26 so that shaft 24 and thereby jaw 316 will be locked in fixed angular relation with respect to the first axis of rotation 16. Jaw 318 is mounted for movement along the first axis of rotation by virtue of threaded shaft 326 which is threadingly received in a cylindrical member 328 which is mounted on plate 30. Threaded shaft 328 may be provided with a turning knob 330 if desired.

One end of threaded shaft 326 may be counter-bored and internally threaded to receive a shaft 332 having a clamping nut 334 thereon. Thus, the threaded shaft 326 is used to position the jaw 318 for grasping objects of similar size. Clamping nut 334 is convenient to permit quick release of objects supported by the jaws.

In order to engrave with the engraving machine, the pattern which is to be engraved is positioned on the blocks 36. Since the blocks have curved slots 38, the pattern will lie along an arc whose center is substantially at the first axis of rotation 16.

A goblet 314 such as illustrated in FIG. 10 is inserted between clamping jaws 316 and 318. Jaw 316 will position the goblet so that its longitudinal axis is coincident with the first axis of rotation 16.

The stylus is then brought into contact with one of the patterns to be engraved. This is accomplished by movement of stylus release arm 300 and elongated control arm 224.

The cross carriage 60 is raised or lowered by actuating crank 48 until both of the projections 156 and 158 (FIG. 7) rest on the surface of the goblet. Significantly, when both projections are touching the surface, the engraving tool is perpendicular to that surface without regard to its degree of curvature or taper. This is because the engraving tool is positioned between the projections so that its cutting face rotates about the second axis of rotation 76.

Movement of the cross carriage radially of the first axis of rotation 16 without moving the tracing means is permitted because of the sliding relation between plate 70 and dovetail 304. Link 268 is adjusted with respect to slot 278 so that it is substantially horizontally disposed when the stylus 250 is midway between the top and bottom of the pattern.

As the stylus is moved through the pattern, its movement is transmitted to the stylus housing 258 and then by way of control link 268 to elongated control arm 274. The movement of the stylus housing 258 is guided by arm 308 which passes through slot 262. However, there is no direct connection between the stylus housing and arm 308. The movement of the elongated control arm 274 is transferred to arm 310 and dovetail 304 by the lower control link 286. By displacing nut 288 in slot 284, the ratio of the movement of stylus 250 relative to that of dovetail 304 along the first axis of rotation 16 can be controlled. The significance of this relationship will be explained below.

The motor 196 is energized. Main drive belt 288 and secondary drive belt 230 cause the motor to rotate the engraving tool 106.

The movement of dovetail 304 as dictated by stylus housing 258 and modified by the relationship of the lower control link to the elongated control arm 274 is transferred to the cross carriage by way of plate 70.

The motion of the engraving tool 106 in response to movement of the stylus 250 can be summarized by referring to FIG. 9 where the cross carriage 60, the spindle carrier 78 and the surface follower 114 are shown schematically. Thus, as seen in FIG. 9, the engraving tool 106 is permitted ro rotate about the first axis of rotation 16 since the cross carriage 60 is mounted for rotation about that axis on radially directed plate 44 and slide plate 46. It is permitted to rotate about the second axis of rotation 76 since the spindle carrier 78 is pivotally coupled to the cross carriage at the second axis of rotation. Translation of the engraving tool parallel to the first axis of rotation 16 is accomplished by sliding the cross carriage with respect to elongated cylindrical bearings 54.

As it goes through the movements described above, the engraving tool remains perpendicular to the surface of the goblet 314. The downward pressure exerted by the negator springs 144 and 146 on the surface follower 144 assures that the projections 156 and 158 are always in contact with the surface to be engraved so that the engraving tool will rotate about the second axis of rotation 76 in response to changes in curvature. Thus, the tool is perpendicular to the surface whether it is convex, concave or tapered. It should be noted that reciprocating movement of the cross carriage and its rotation about first axis of rotation 16 are positive inputs to the engraving tool in response to a corresponding movement of the stylus in the pattern to be engraved.

However, rotation about the second and third axes of rotation 76 and 126 is dependent solely on the curvature of the surface being engraved.

The lower control link 286 has two functions. Its first function is to interconnect the stylus movement to the movement of the cross carriage by way of elongated control arm 274.

Its second function is to change the height of the engraving relative to the height of the pattern. This is necessary to avoid distortion of the engraving on the engraved surface.

The reason for this will become apparent from what will follow. Considering FIG. 1, if it is desired to reproduce the H on an object such as the goblet illustrated in FIG. 10, the goblet is clamped into position and the cross carriage is lowered until the surface follower engages its surface. The horizontal bar of the letter H when engraved will occupy an arc having the identical sector as that which appears on the pattern. This is because the entire machine rotates as a unit about the first axis of rotation 16. The actual length of the engraved arc will depend upon the diameter of the goblet to be engraved. A goblet having a larger diameter will have an arc which is actually longer while a goblet having a smaller diameter will have an arc which is actually shorter.

Unless there is compensation, the engraved legs of the letter H will be the same length as the legs on the pattern. Under some circumstances this is desirable. However, in most instances, it is necessary to vary the height of the legs of the letters so that they are proportional to the length of the horizontal bar. Such an instance might occur when a goblet of small diameter is being engraved. If such a compensating means were not available, each of the letters would be narrow and very tall.

Accordingly, the juncture of the lower control link 286 and the elongated control arm 274 can be adjusted by nut 288. When nut 288 is secured at the upper end of slot 284, the length of the letters engraved will be the same as that on the pattern. However, as the nut 288 is moved toward pin 276, the engraved length of the letters will be less than that of the pattern. This is because the movement of the engraving tool along the first axis of rotation 16 will be identical to the movement of nut 288 along that axis. This movement becomes proportionally less for a given displacement of the stylus as the nut is moved closer to pin 276.

The engraving machine described above has vast utility in that it can be used to engrave surfaces of many varied configurations. Thus, it can be used to engrave cylindrical surfaces, tapered surfaces or curved surfaces, both convex and concave. In each instance, the machine closely follows the surface to be engraved so that engraving can be accomplished with precision. Surfaces of any diameter may be engraved and the proportions of engraved patterns may be controlled.

While the invention has been described with reference to one embodiment thereof, it is apparent that many forms and embodiments will be obvious to those skilled in the art in view of the foregoing description. Thus, the scope of the invention should not be limited by that description, but rather, only by the scope of the claims appended hereto.

I claim:

1. A machine for engraving a surface which is curved about a longitudinal axis comprising; support means, first means for carrying a pattern to be engraved on said curved surface, said first means being coupled to said support means; second means defining a first axis of rotation, said second means being mounted on said support means; third means for supporting an engraving tool, said third means being operative to position the cutting face of an engraving tool along a radius from said first axis of rotation, said third means being mounted on said support means for rotation about said first axis of rotation and translation parallel to said first axis of rotation; fourth means for coupling said third means to the pattern to be engraved, said fourth means including pattern tracing means, said fourth means being operative to rotate and translate with respect to said first axis in response to movement of said pattern tracing means in the pattern; said third means defining a second axis of rotation, said second axis of rotation being perpendicular to said first axis of rotation and lying in a plane which is parallel to a plane passing through said first axis of rotation; and guide means on said third means, said guide means being operative to engage the surface to be engraved and maintain the engraving tool in perpendicular relation thereto.

2. A machine as defined in claim 1 wherein said guide means lay substantially at the intersection of first and second planes wherein said first plane passes substantially through said first axis of rotation, and said second plane passes substantially through said second axis of rotation.

3. A machine as defined in claim 1 wherein said third means includes a cross carriage, said cross carriage being supported on said support means for movement relative to said first axis, a carrier, said carrier being pivotally coupled to said cross carriage for rotation about said second axis, a surface follower, said surface follower being coupled to said carrier for pivotal movement about a third axis of rotation, said third axis of rotation being parallel to said first axis of rotation, and said surface follower supports said guide means.

4. A machine as defined in claim 3 including biasing means for urging said surface follower to rotate about said third axis toward said first axis of rotation so that said guide means can engage a surface to be engraved.

5. A machine as defined in claim 1 including a chuck for an engraving tool, said chuck being coupled to said third means and being rotatable about said first and second axes of rotation with said third means in response to movement of said pattern tracing means.

6. A machine as defined in claim 1 wherein said third means comprises a surface follower and a cross carriage, said surface follower supporting said guide means, said surface follower being an elongated member disposed transversally of said first axis of rotation, and means mounting said surface follower on said cross carriage for rotation about said second axis of rotation in response to engagement of the surface to be engraved by said guide means, and said cross carriage is mounted on said support means for movement relative to said first axis of rotation.

7. A machine as defined in claim 6 wherein said means for mounting said surface follower comprises a spindle carrier, said spindle carrier extending transversally of said first axis of rotation and being mounted on said cross carriage for rotation about said second axis of rotation.

8. A machine as defined in claim 6 including means for urging said surface follower toward said first axis of rotation.

9. A machine as defined in claim 1 wherein said third means is coupled to said means defining said first axis of rotation by coupling means, and said coupling means is operative to selectively move said third means toward and away from said first axis of rotation.

10. A machine as defined in claim 1 including means for mounting the pattern to be engraved on said support means, and said mounting means is operative to position the pattern in substantially coaxial relation with said first axis of rotation.

11. A machine as defined in claim 10 wherein said fourth means comprises a control arm, one end of said control arm being coupled to said support means for rotation about said first axis of rotation and rotation in a plane passing through said first axis of rotation, means coupling said tracing means to said control arm, and means for coupling said control arm to said third means.

12. A machine as defined in claim 1 wherein said fourth means comprises a control arm, one end of said control arm being coupled to said support means for rotation about said first axis of rotation and rotation in a plane passing substantially through said first axis of rotation, means coupling said tracing means to said control arm, and a rigid elongated member having one end coupled to said third means and its other end coupled to said control arm.

13. A machine as defined in claim 12 including means for selectively displacing said other end of said rigid elongated member along said control arm so that its distance from said first axis of rotation can be varied.

14. A machine as defined in claim 1 wherein said third means comprises a radially directed member mounted for rotation about said first axis of rotation and extending to both sides thereof, a cross carriage supported on said radially directed member on one side of said first axis of rotation, means for driving an engraving tool, said driving means being supported on said radially directed member in substantially diametrically opposed relation to said cross carriage to substantially counterbalance said cross carriage, said drive means being normally disposed between said first axis of rotation and said support means, and means on said radially directed member for moving said cross carriage radially of said first axis of rotation.

15. A machine for engraving a surface which is curved about a longitudinal axis comprising support means, first means for carrying a pattern to be engraved on said curved surface, said first means being coupled to said support means, second means defining a first axis of rotation, said second means being mounted on said support means, a cross carriage, means coupling said cross carriage to said support means for rotation about said first axis of rotation, said coupling means and said cross carriage being in sliding engagement so that said cross carriage can slide on said coupling means along a path parallel to said first axis of rotation, said cross carriage including means for defining a second axis of rotation, a spindle carrier, said spindle carrier comprising at least first and second legs, said first leg being coupled to said cross carriage for rotation about second axis of rotation, said second leg comprising means for supporting an engraving tool so that it lies along a radius from said first axis of rotation, guide means for maintaining an engraving tool in perpendicular relation to said surface to be engraved, said guide means comprising a third member mounted on said first leg for rotation about a third axis of rotation, and said third axis of rotation is substantially parallel to and spaced from said first axis of rotation, and means for coupling said cross carriage to the pattern to be engraved.

16. A machine as defined in claim 15 including an engraving tool, said engraving tool being supported by said second leg and overlying a portion of said third member, said third member having an aperture at said portion to permit said engraving tool to extend therethrough, and two projections supported on said guide means for engagement with the surface to be engraved, and said projections are spaced along a plane passing through said first axis of rotation with said engraving tool disposed therebetween.

17. A machine for engraving a surface which is curved about a longitudinal axis comprising; support means, first means for carrying a pattern to be engraved on said curved surface, said first means being coupled to said support means; second means defining a first axis of rotation, said second means being mounted on said support means, third means for supporting an engraving tool, said third means being operative to position the cutting face of an engraving tool along a radius from said first axis of rotation, said third means being mounted on said support means for rotation about said first axis of rotation and translation parallel to said first axis of rotation; fourth means for coupling said third means to the pattern to be engraved, said fourth means including pattern tracing means and a control arm, one end of said control arm being coupled to said support means for rotation about said first axis of rotation and rotation in a plane passing through said first axis of rotation, means coupling said tracing means to said control arm, and a rigid elongated member having one end coupled to said third means and its other end coupled to said control arm.

18. A machine as defined in claim 17 wherein said pattern tracing means includes a housing, said housing having a recess therein for receiving a stylus, said housing having a slot extending therethrough, a guide arm, said guide arm being coupled to said third means and being slidably received in said slot, and a link, said link being pivotally connected at one end to said housing and at its other end to said control arm.

* * * * *